Dec. 8, 1953  J. R. OISHEI  2,661,492
CABLE TENSIONING DEVICE FOR A WINDSHIELD
CLEANER INSTALLATION
Filed Feb. 1, 1951
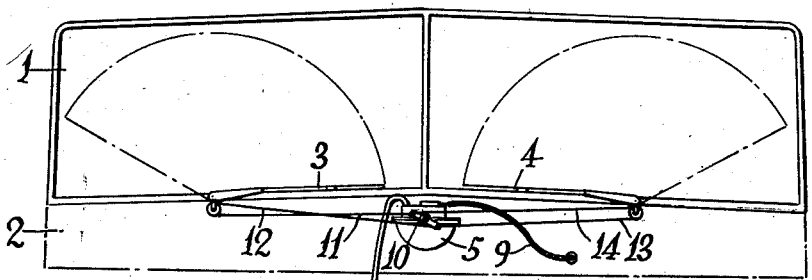
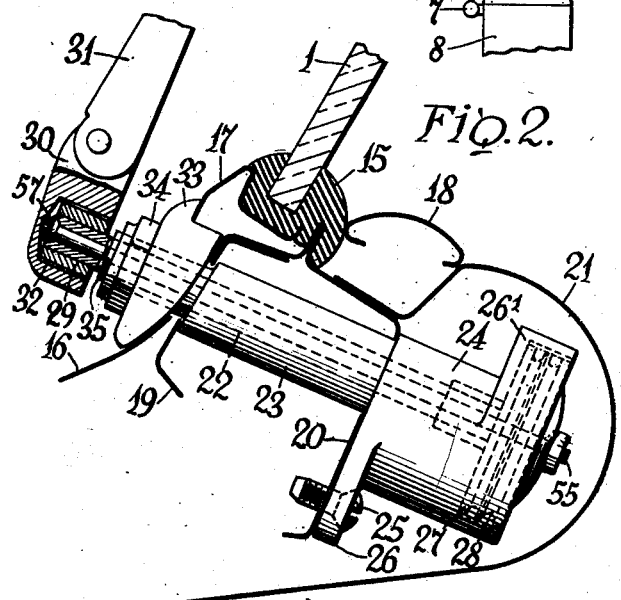
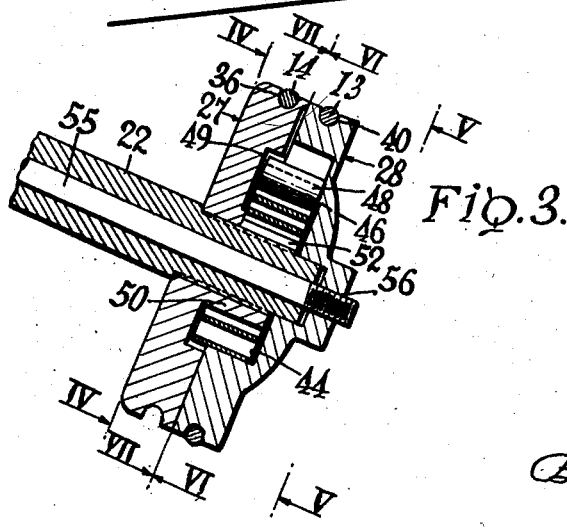
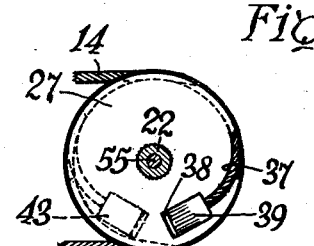
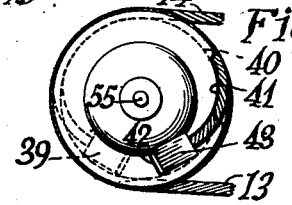
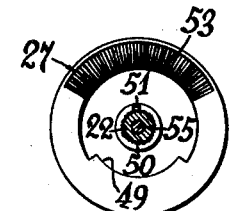
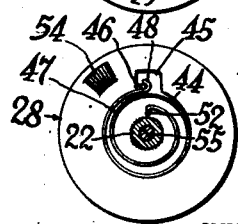
INVENTOR.
John R. Oishei,
BY
Bean, Brooke, Buckley & Bean
ATTORNEYS Patented Dec. 8, 1953

2,661,492

UNITED STATES PATENT OFFICE 2,661,492

CABLE TENSIONING DEVICE FOR A WINDSHIELD CLEANER INSTALLATION

John R. Oishei, Buffalo, N. Y., assignor to Trico Products Corporation, Buffalo, N. Y.

Application February 1, 1951, Serial No. 208,891

12 Claims. (Cl. 15—253).

This invention relates generally to the windshield cleansing art, and more particularly to a windshield cleaner of the type wherein a plurality of wiping elements are oscillated across a windshield surface to cleanse predetermined areas of the same.

In windshield cleaners of the above-mentioned type, it is frequently very difficult to make any adjustments once the windshield cleaner is installed. This problem, obviously one of importance, becomes increasingly significant when it is realized that quite often final adjustments can not be made properly until the windshield cleaner is installed on the vehicle.

For example, present day windshield cleaners commonly rely on a cable drive, wherein cables are utilized to impart the oscillating motion of the wiper motor drive shaft to the rockshafts on which the wiper elements are mounted. Obviously, if the windshield cleaner is to operate satisfactorily, the cables must be under tension and slack therein must be avoided. Since the various components of a windshield cleaner are located on different portions of the vehicle, it is virtually impossible as a practical matter to finally adjust the tension in the cables until the entire unit has been installed. However, once it is installed, many portions of the windshield cleaner are not easily accessible and it is very difficult to make adjustments thereon. For example, the mounting shaft or rockshaft usually extends into the area behind the dashboard, which area is notoriously crowded and cramped. If the cable tensioning means are located on the inner side of the mounting shaft, it is extremely inconvenient to make adjustments thereon.

If, as has been suggested, the tensioning means takes the form of a turnbuckle or some similar mechanism located on the cables themselves, the problem still exists because the cables are usually located in the cramped quarters behind the dashboard and are virtually inaccessible.

Thus, the various arrangements which have previously been suggested and tried are unsatisfactory because they fail to alleviate the inconvenience and difficulty encountered in adjusting the cable tension.

Accordingly, it is a primary object of this invention to provide a windshield cleaner of the cable drive type having readily accessible means for adjusting cable tension.

A further object of this invention is to provide a cable drive windshield cleaner installation having means for adjusting cable tension, which means are easily accessible exteriorly of the vehicle on which the cleaner is installed.

In addition, it is an object of this invention to provide a windshield cleaner of the aforementioned type which is relatively simple in construction and reliable in operation.

These and further objects will become apparent from a perusal of the ensuing detailed description together with the accompanying drawing wherein:

Fig. 1 illustrates the manner in which the windshield cleaner of the present invention is installed on a vehicle;

Fig. 2 is a view, partly in section, of a wiper actuating shaft and the novel cable tension adjusting means of the instant invention;

Fig. 3 is a detail view, partly in section, of the cable tension adjusting means;

Fig. 4 is a view partly in section taken along the line IV—IV of Fig. 3;

Fig. 5 is a plan view taken along the line V—V of Fig. 3;

Fig. 6 is a view, partly in section, taken along the line VI—VI of Fig. 3; and

Fig. 7 is a view, partly in section, taken along the line VII—VII of Fig. 3.

As illustrated in Fig. 1, the windshield cleaner of the present invention is installed on a vehicle having a windshield 1 and a firewall or other partition 2. Wipers 3 and 4 are arranged to be oscillated across the surface of windshield 1, and a wiper motor 5 is mounted on firewall 2. Wiper motor 5 is of the conventional suction operated vane type, and is connected through an exhaust line 6 to the intake manifold 7 on engine block 8. A Bowden wire 9 extends between wiper motor 5 and the operator's compartment whereby the operator can initiate and arrest a windshield cleansing operation at will. Wiper motor 5 is energized and deenergized in a conventional manner, and the details thereof form no part of the instant invention.

A drive arm 10 is mounted on wiper motor 5 so as to be oscillated thereby, and drive cables 11, 12, 13 and 14 are secured to drive arm 10. One end of each of cables 11 and 14 is secured to one end of drive arm 10, and one end of each of cables 12 and 13 is secured to the opposite end of drive arm 10. The other ends of said cables are drivingly connected to wipers 3 and 4 in a manner to be described.

Each of wipers 3 and 4 have identical mounting arrangements, and for ease of illustration only one such mounting arrangement is shown. For purposes of description, let it be assumed that Fig. 2 shows the mounting arrangement of wiper 4.

As shown in Fig. 2, the windshield 1 is surrounded by a sealing gasket 15 which is mounted on the inner end of the exterior hood portion 16. Pieces of trim molding 17 and 18 surround gasket 15 on the exterior and interior respectively of the vehicle. A downwardly extending partition 19 is secured along the inner side of hood 16, and a second partition 20 extends inwardly and downwardly from the inner end of hood 16. A dashboard 21 is secured to the upper end of partition 20 and serves, among other purposes, to help secure trim molding 18 in place.

A hollow rockshaft 22 extends from the vehicle exterior through a mounting member 23, which mounting member fits between partitions 19 and 20, and into a housing 24. Housing 24 is secured to a partition 20 by means of a plurality of screws, one of which is shown at 25, which extend through an attaching ear 26 on said housing.

Housing 24 has an enlarged recess 26' in the outer end thereof, which recess receives dual winding drums 27 and 28, to which drums are secured two of the aforementioned cables in a manner to be described. Drum 27 is securely mounted on rockshaft 22, and drum 28, which is adapted for friction engagement with drum 27, is rotatably supported on the inner end of rockshaft 22.

A drive burr 29 is secured on the outer end of rock-shaft 22 with a force fit, and a mounting head 30, which is pivoted to a wiper drive arm 31, has a recess 32 which receives said burr 29. Both said burr and said recess may be serrated whereby to achieve a tight fit. A trim piece 33 fits over rockshaft 22 and against hood portion 16, and a nut 34 engages a threaded extension 35 of mounting member 23 to hold the complete assembly in place. A wiper, such as 4, is carried on the outer end of drive arm 31. It is noted that extension 35 of mounting member 23 extends between trim piece 33 and rockshaft 22.

The novel cable tensioning means of the present invention is arranged as follows.

Cable 14 extends along a groove 36 in the edge of drum 27, then through a cut-out portion 37 and into a recess 38 in the outer face of said drum. A lug 39 is attached to the end of cable 14 and fits snugly within recess 38. In an identical manner, cable 13 extends along a groove 40 in the edge of drum 28, and through a cut-out portion 41 and into a recess 42 in the outer face of said drum. A lug 43 is attached to the end of cable 13 and fits snugly into recess 42. In this manner, the oscillatory motion of wiper motor drive arm 10 is transmitted through cables 14 and 13 to drums 27 and 28.

An enlarged recess 44 is provided in the inner face of drum 28, and a smaller recess 45, having a flange 46, is provided in the wall of recess 44. A torsion spring 47 fits within recess 45, and has a flanged outer end 48 which fits around flange 46.

Drum 27 has a shallow recess 49 which receives the exposed face of spring 47, and a center boss 50 having a notch 51 therein which receives a flange 52 on the inner end of torsion spring 47. It should be noted that boss 50 is hollow throughout its length and is internally serrated so as to fit snugly on the inner end of rockshaft 22. Also, the inner faces of drums 27 and 28 are serrated, as at 53 and 54 respectively, for a purpose to be described. A locking and releasing bolt 55 extends through rockshaft 22 from the exterior of the vehicle and threadedly engages drum 28, as at 56. A slotted head 57 is provided on the outer end of bolt 55, whereby said bolt may be rotated to secure together drums 27 and 28.

It should be understood that an identical mounting is provided for wiper 3, which mounting has an identical connecting arrangement with cables 11 and 12.

The operation of this invention is as follows.

The cables 11, 12, 13 and 14 are secured to their respective drums, and the drums, 27 and 28 in the drawing, are rotated relative to each other until torsion spring 47 is fully loaded at which time bolt 55 is turned until drums 27 and 28 are secured tightly together. Serrations 53 and 54 coincide when drums 27 and 28 are in this position and aid in preventing relative movement therebetween. The windshield cleaner is then installed in place on the vehicle.

At this point, there will usually be an objectionable amount of slack in the cables, and this is removed and tension applied thereto after installation, by loosening bolt 55. As soon as bolt 55 is loosened, drums 27 and 28 rotate relative to each other under the influence of torsion spring 47, and the relative rotation of said drums is such as to place cables 13 and 14 under tension. Once the tension in said cables has been finally adjusted, bolt 55 is tightened and mounting head 30 of wiper drive arm 31 is positioned on burr 29. At this point, the assembly and installation is complete, and the windshield cleaner is ready for use. If spring 47 has not completely unwound, and the cables subsequently require further tensioning, it is only necessary to remove mounting head 30 of wiper drive arm 31 and again loosen bolt 55. As previously stated, tension is applied to cables 11 and 12 in an identical manner.

The superior advantages of the present invention are obvious. It permits final adjustment of cable tension after the windshield cleaner has been installed, and the tension adjusting means is easily accessible exteriorly of the vehicle, all that is required being the removal of the wiper drive arm from the rockshaft and turning the bolt 55. The ease and convenience of this arrangement should be contrasted with the necessity of groping in the crowded area behind the dashboard as required in prior art installations. In addition, although the adjusting means is easily accessible exteriorly of the vehicle, it is completely covered and protected by the wiper drive arm.

Obviously, various modifications will become apparent to those skilled in the art, and it is intended to cover all such modifications as fit within the scope of the appended claims.

Having fully disclosed and completely described a preferred embodiment of the present invention, what is claimed as new is as follows:

1. A windshield cleaner comprising a wiper, a wiper motor, a tubular rotatable shaft, means mounting said wiper on said rotatable shaft, a pair of coaxial drums, one being fixed to the shaft and the other rotatable with respect thereto, a drive cable means extending between said wiper motor and each drum, means biasing the two drums for relative rotation, and means securing said two drums against relative rotation, said last-named means including a releasable locking element extending through said rotatable shaft.

2. A windshield cleaner comprising a wiper, a wiper motor, a two-part member mounted for rotation as a unit, said wiper being mounted on one part of said two-part member, a drive cable means extending between said wiper motor and each part of said member, means imparting relative rotation to the two parts of said member, and means securing the two parts of said member against relative rotation, said last-named means, including a releasable locking member accessible from the part of said member on which said wiper is mounted.

3. A windshield cleaner comprising a wiping element, a wiper motor, an elongate member comprising two parts mounted for rotation as a unit, said wiper being mounted on one end of one of said parts, the other of said parts being mounted for rotation relative to the other end of said one of said parts, cable drive means extending between said wiper motor and each part of said two-part member, resilient means imparting relative rotation to the two parts of said member, and means securing the two parts of said member against relative rotation, said last-named means including releasable locking means accessible from the end of said member on which said wiper is mounted.

4. A windshield cleaner comprising wiping means, a wiper motor, a rockshaft mounted for rotation, said rockshaft comprising a first and a second part adapted for rotation as a unit, said wiping means being removably mounted on one end of said first part and said second part being mounted at the other end of said first part, cable drive means extending between said wiper motor and each of said parts, means biasing said first and said second part for relative rotation, and means securing said first and said second part against relative rotation, said last-named means including a releasable locking member normally concealed by said wiping means and accessible from said one end of said first part after first removing the wiping means.

5. A windshield cleaner comprising a wiping element, a wiper motor, a rotatable rockshaft unit comprising two parts, said wiper being mounted on one end of one of said parts, the other of said parts being mounted on the other end of said one of said parts for relative rotation, cable drive means extending between said wiper motor and each of said parts for exerting a pulling force thereon in alternation with the other to oscillate the wiping element, means imparting relative rotation to the two parts for taking up cable slack, and means securing the two parts of said rockshaft unit against relative rotation, said last-named means including a releasable locking element accessible from the end of said rockshaft on which said wiper is mounted.

6. A rockshaft for use in a windshield cleaner having a cable drive comprising a member formed of a first part and a second part relatively rotatable but adapted to rotate as a unit, said first part being in the form of a shaft having an arm attaching head at one end to carry the wiping element and both parts being adapted for connection to a cable drive, resilient means on said member biasing the first and second parts of said member into relative rotation to absorb cable slackness, and means releasably securing the first and second parts of said member against relative rotation, said last-named means including a releasable locking element extending through said first part and connected to the second part thereof, said extending element being accessible in the attaching head to so secure the parts against relative rotation.

7. A windshield wiper mounting means comprising a hollow shaft adapted to carry a windshield wiper drive arm at one end thereof, a first winding reel mounted on the other end of said shaft, a second winding reel rotatably supported on said other end of said shaft, said winding reels being adapted for connection to a cable drive, means biasing said winding reels into relative rotation, and means releasably securing said winding reels against relative rotation, said last-named means including a releasable locking element extending longitudinally through said shaft.

8. A windshield cleaner installation on a vehicle having a windshield and a hood portion, comprising a wiping means, an elongate shaft assembly formed in a first and a second part adapted to rotate as a unit, said first part extending through the hood portion of said vehicle from the exterior to the interior thereof, said wiping means being removably mounted on the exterior end of said first part and said second part being carried on the interior end of said first part, a wiper motor, cable drive means extending between said wiper motor and said second part, means automatically acting to impart relative rotation between said first and second parts when relatively free, and means releasably securing said first and second parts against relative rotation, said last-named means including a releasable locking element connected to the second part and extending through said first part to the exterior end beneath the wiping means.

9. In a combination with a vehicle having a windshield and a hood portion, a windshield cleaner comprising a wiping element, a rockshaft rotatably mounted on said hood portion and extending from the exterior to the interior of said vehicle, means supporting said wiping element on the exterior end of said rockshaft, a first winding drum mounted on the interior end of said rockshaft, a second winding drum detachably carried on the interior end of said rockshaft, a wiper motor, cable drive means extending between said wiper motor and said winding drums, biasing means imparting relative rotation to said winding drums, and means locking said winding drums against relative rotation, said last-named means including an unlocking element accessible exteriorly of the vehicle.

10. In a vehicle having a windshield and a hood portion, a windshield cleaner installation comprising a wiper element, a rockshaft extending through said hood portion from the exterior to the interior of said vehicle, means removably supporting said wiper element on the exterior end of said rockshaft, a winding drum carried on the interior end of said rockshaft, a second winding drum coaxial with the first drum and rotatable relative thereto, a wiper motor carried by said vehicle, cable drive means extending between said wiper motor and said winding drums, means biasing said drums for relative rotation, and means releasably securing said drums against relative rotation, said last-named means including a releasable locking element enclosed by said wiper element supporting means, whereby said locking element is rendered accessible by removing said wiper element supporting means from said rockshaft.

11. In a windshield cleaner, a rockshaft having an arm attaching burr at one end, a cable transmission including relatively movable parts on the opposite end of the shaft connected to the cable for taking up the slack thereof, and adjustable means preventing such relative movement, said last-named means being accessible for adjustment at the burr for being concealed by an attached arm.

12. A windshield wiper mounting means comprising a hollow shaft adapted to carry a windshield wiper drive arm at one end thereof, a first winding reel mounted on the other end of said shaft, a second winding reel rotatably supported on said other end of said shaft, said winding reels being adapted for connection to a cable drive, torsion spring means biasing said winding reels into relative rotation, and means releasably securing said winding reels against relative rotation, said last-named means including a releasable locking element accessible for adjustment at said one end of said shaft.

JOHN R. OISHEI.

References Cited in the file of this patent

UNITED STATES PATENTS

| Number | Name | Date |
|---|---|---|
| 796,720 | Hanscom | Aug. 8, 1905 |
| 964,879 | Park | July 19, 1910 |
| 1,090,962 | Armstrong | Mar. 24, 1914 |
| 2,172,488 | Waters | Sept. 12, 1939 |
| 2,538,344 | Wallberg | Jan. 16, 1951 |
| 2,572,750 | Oishei | Oct. 23, 1951 |